Sept. 6, 1949.    P. SIEVER    2,481,166
TIRE DEFLATION INDICATOR
Filed Dec. 5, 1946
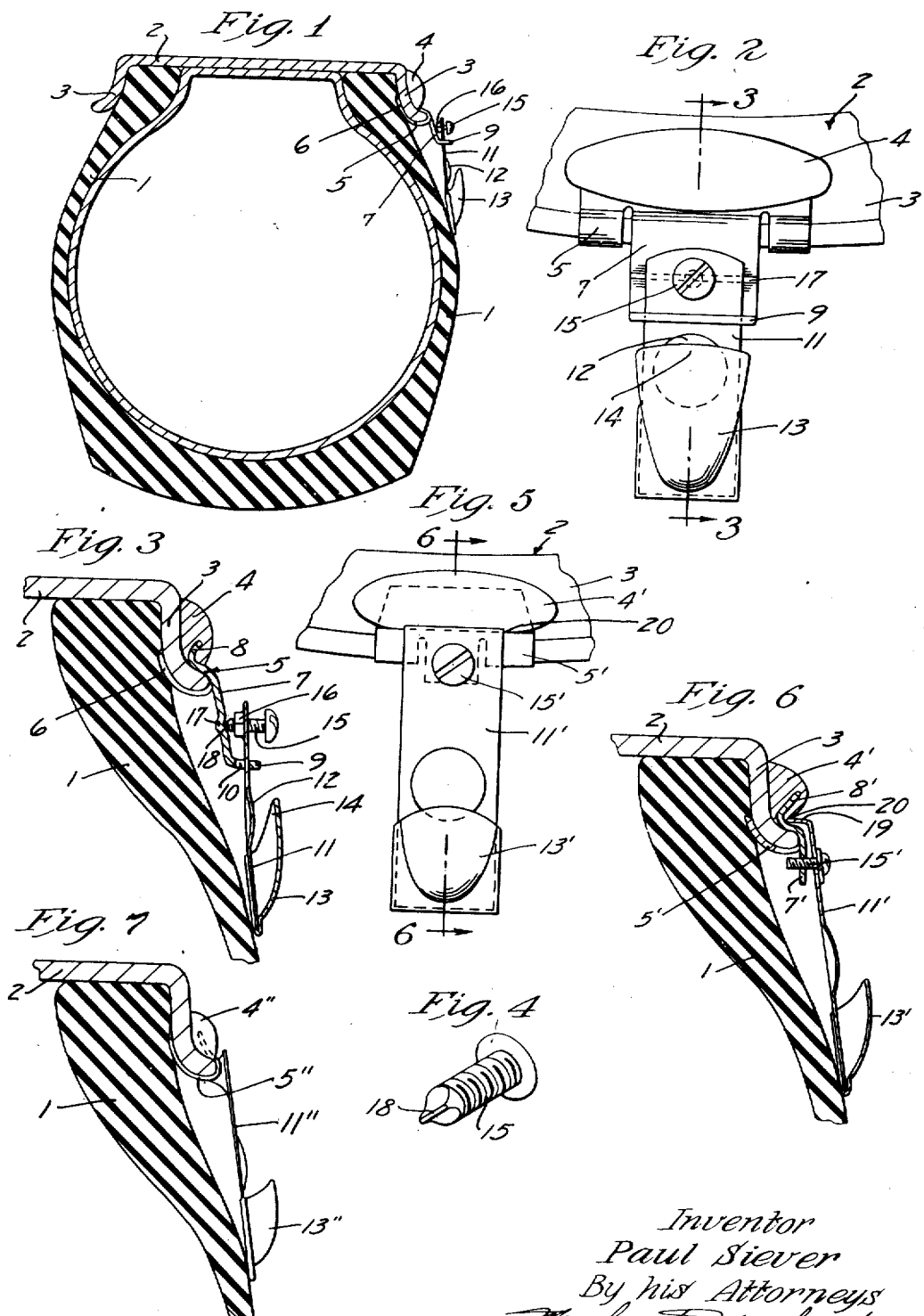
Inventor
Paul Siever
By his Attorneys
Merchant & Merchant

UNITED STATES PATENT OFFICE 2,481,166

TIRE DEFLATION INDICATOR

Paul Siever, Minneapolis, Minn., assignor to Tire-Larm Co., Minneapolis, Minn., a corporation of Minnesota Application December 5, 1946, Serial No. 714,285

1 Claim. (Cl. 116—34)

My invention relates to a deflation indicator for pneumatic tires and has for its primary object the provision of such a device which is simple in construction, inexpensive to manufacture, easy to install, accurate in performance, and durable.

Another object of my invention is the provision of such a structure in which the tire deflation indicator may be accurately adjusted to various sized tires to produce an audible signal at any desired reduction in air pressure within the tire.

The above and numerous other objects of my invention will become apparent from the following detailed specification, appended claim, and attached drawings.

Referring to the drawings wherein like characters indicate like parts throughout the several views:

Fig. 1 is a sectional view of a rim-equipped pneumatic tire showing the preferred embodiment of my novel device in side elevation;

Fig. 2 is an enlarged fragmentary front elevation of the structure illustrated in Fig. 1;

Fig. 3 is a fragmentary view corresponding somewhat to Fig. 1, but taken on the line 3—3 of Fig. 2;

Fig. 4 is an enlarged view in perspective of an adjusting screw used in the structure of Figs. 1 to 3 inclusive;

Fig. 5 is a fragmentary front elevational view showing modifications in structure;

Fig. 6 is a sectional view taken on the line 6—6 of Fig. 5; and

Fig. 7 is a view corresponding to Fig. 6 showing a simplified form of my device.

Referring with greater particularity to the drawings, the numeral 1 indicates a pneumatic tire which is mounted on a rim 2 having spaced out-turned tire bead engaging flanges 3. The numeral 4 indicates an elongated wheel balancing weight which is held in frictional engagement with the outer surface of the flange 3 by a hook-like anchoring bracket 5, the extreme inner end 6 of which is adapted to be inserted between the flange 3 and the bead of the tire 1.

In the preferred embodiment of my invention, shown in Figs. 1 to 4 inclusive, the anchoring bracket 5 is provided with an anchoring lip 7 which projects radially outwardly of the rim 2 in the direction of the side wall of the tire 1. Preferably, and as shown, anchoring bracket 5 is in the nature of a metal clip adapted to be slipped over the edge of the rim flange 3, and the anchoring lip 7 is formed integrally therewith. It is optional in this structure whether the wheel balancing weight 4 be utilized, but, in the event that it is, it is preferably cast around an extended outer portion 8 of the anchoring bracket 5. As shown, particularly in Fig. 3, the anchoring lip 7 at its free end is bent outwardly as indicated at 9 and is provided with a transverse slot or opening 10 to receive a sound-producing tongue 11. Sound-producing tongue 11 is of a type in common use in noise-making novelties, often referred to as clickers, and is made up of an elongated flat strip of spring steel having a dimple or depression 12 formed in its intermediate portion. The free end of the sound-producing tongue is preferably, and as shown, provided with a sound resonating cup 13, the hood-like open end 14 of which immediately overlies the depression 12.

As will be observed, the free end of the sound-producing tongue 11 is adapted to press against the side wall of the tire 1. For the purpose of forcing the free end of the sound-producing tongue into contact with the side wall of the tire 1, so as to produce a clicking noise under the desired degree of deflation of the tire, I provide an adjustment screw 15 which extends through the sound-producing tongue 11 adjacent its anchored end and has threaded engagement with a boss or nut 16 secured to the tongue 11 by soldering or the like. The inner end of adjustment screw 15 is adapted to be seated in a depression 17 in the anchoring lip 7, which preferably, and as shown, is in the nature of an extended groove. To prevent accidental rotation of the adjustment screw 15, but to permit manual adjustment thereof, I preferably flatten the end of the screw 15 as at 18.

In Figs. 5 and 6, I have shown a modified form of my construction. As there shown, sound-producing tongue 11' has an inturned end 19 which is adapted to be seated in a recess or groove 20 located either in the weight 4' or in the anchoring bracket 5'. Lock washer equipped anchoring screw 15' extends through the intermediate portion of sound-producing tongue 11' and the anchoring lip 7' and has screw threaded engagement with the latter.

With either of the structures illustrated in Figs. 1 to 6 inclusive, it is possible to attain precisely the desired degree of tension of the free end of the sound-producing tongues 11 or 11' against the side wall of the tire 1, in order that a clicking sound be produced thereby when the pre-determined extent of deflation of the tire is reached, and upon rotation of the tire with its consequent bulging of the side wall.

In the simplified structure illustrated in Fig. 7, the inner end of sound-producing tongue 11'' is welded or otherwise secured directly to the anchoring bracket 5" and no adjustment thereof is provided.

My invention has been thoroughly tested and found to be completely satisfactory for the accomplishment of the above objects.

What I claim is:

In a device of the class described, a wheel, a pneumatic tire equipped rim on said wheel, an anchoring bracket secured to the tire bead engaging flange of said rim, an anchoring lip projecting outwardly from said anchoring bracket in a direction radially of said rim, a slot adjacent the free end of said anchoring lip, a sound-producing tongue extending through said slot with one end overlying the anchoring lip and with its free end in contact with the side wall of said tire, a recess in said anchoring lip, and an adjusting screw carried by said sound-producing tongue and having its inner end seated in said recess.

PAUL SIEVER.

REFERENCES CITED

The following references are of record in the file of this patent:

UNITED STATES PATENTS

| Number | Name | Date |
|---|---|---|
| 1,409,360 | Clarke | Mar. 14, 1922 |
| 1,729,619 | Laro | Oct. 1, 1929 |
| 2,273,413 | McCulloch | Feb. 17, 1942 |